US008093555B2

(12) United States Patent
Yamaguchi

(10) Patent No.: US 8,093,555 B2
(45) Date of Patent: Jan. 10, 2012

(54) MASS SPECTROMETER

(75) Inventor: Shinichi Yamaguchi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 12/743,932

(22) PCT Filed: Nov. 21, 2007

(86) PCT No.: PCT/JP2007/001280

§ 371 (c)(1), (2), (4) Date: May 20, 2010

(87) PCT Pub. No.: WO2009/066354

PCT Pub. Date: May 28, 2009

(65) Prior Publication Data

US 2010/0258716 A1 Oct. 14, 2010

(51) Int. Cl.
*H01J 49/40* (2006.01)
*G01N 27/62* (2006.01)

(52) U.S. Cl. ........................ 250/287; 250/290; 250/292

(58) Field of Classification Search .................. 250/287, 250/290, 292

See application file for complete search history.

(56) References Cited

U.S. PATENT DOCUMENTS 3,387,131 A * 6/1968 Helmer ........................ 250/299
5,867,139 A 2/1999 Tanaka et al.
5,877,736 A 3/1999 Imajo et al.
6,172,661 B1 1/2001 Imajo et al.
6,300,625 B1 * 10/2001 Ishihara ........................ 250/287
7,038,198 B2 * 5/2006 Yamaguchi et al. .......... 250/287
7,148,473 B2 * 12/2006 Yamaguchi et al. .......... 250/287
7,211,792 B2 * 5/2007 Yamaguchi et al. .......... 250/287
7,227,131 B2 * 6/2007 Yamaguchi et al. .......... 250/287
7,355,168 B2 * 4/2008 Yamaguchi .................. 250/282
7,439,520 B2 * 10/2008 Vestal .................. 250/396 ML
RE40,771 E 6/2009 Tanaka et al.
7,755,036 B2 * 7/2010 Satoh .......................... 250/287
2002/0033787 A1 3/2002 Parak et al.
2002/0162774 A1 * 11/2002 Scheidemann et al. ....... 209/213
2002/0167026 A1 11/2002 Azami et al.
2004/0021650 A1 2/2004 Yamashita et al.
2004/0149904 A1 * 8/2004 Scheidemann et al. ....... 250/298
2004/0155851 A1 8/2004 Morii
2005/0045817 A1 * 3/2005 Yamaguchi et al. .......... 250/287

(Continued)

FOREIGN PATENT DOCUMENTS

JP 08-076147 3/1996

(Continued)

*Primary Examiner* — David A Vanore
(74) *Attorney, Agent, or Firm* — Sughrue Mion, PLLC

(57) ABSTRACT

A mass analysis is initially performed while applying appropriate voltages to the electrodes so that ions injected through an entrance gate electrode (5) into a loop orbit (3) are guided through approximately one half of the loop orbit (3) and diverted at an exit gate electrode (6) toward an ion detector (7). Based on the intensities of the peaks appearing on a mass spectrum obtained by this mass analysis, one or more objective ions are selected and a time parameter is specified so that the voltage applied to the exit gate electrode (6) changes when none of the ions flying along the loop orbit (3) are passing through the exit gate electrode (6). As a result, the orbit of the objective ions will assuredly changed so that they will be directed toward the ion detector (7) after flying through the loop orbit (3) multiple times. Thus, the mass information of the objective ions can be assuredly obtained.

12 Claims, 3 Drawing Sheets

U.S. PATENT DOCUMENTS

| | | | | |
|---|---|---|---|---|
| 2005/0077461 | A1* | 4/2005 | Yamaguchi et al. | 250/287 |
| 2005/0151076 | A1* | 7/2005 | Yamaguchi et al. | 250/291 |
| 2005/0194528 | A1* | 9/2005 | Yamaguchi et al. | 250/287 |
| 2005/0247869 | A1 | 11/2005 | Yamaguchi | |
| 2006/0163473 | A1* | 7/2006 | Vestal | 250/291 |
| 2006/0202940 | A1 | 9/2006 | Azami et al. | |
| 2007/0247932 | A1 | 10/2007 | Tobita et al. | |
| 2008/0012841 | A1 | 1/2008 | Morii | |
| 2009/0026365 | A1* | 1/2009 | Satoh | 250/287 |
| 2009/0102824 | A1 | 4/2009 | Tanaka et al. | |
| 2009/0179150 | A1* | 7/2009 | Kovtoun et al. | 250/283 |
| 2010/0051799 | A1* | 3/2010 | Makarov | 250/282 |
| 2010/0140469 | A1* | 6/2010 | Nishiguchi | 250/287 |
| 2010/0282965 | A1* | 11/2010 | Nishiguchi et al. | 250/282 |

FOREIGN PATENT DOCUMENTS

| | | | |
|---|---|---|---|
| JP | 09-288260 | | 11/1997 |
| JP | 2001-143655 | A | 5/2001 |
| JP | 2002-189203 | | 7/2002 |
| JP | 2002-335153 | | 11/2002 |
| JP | 2004-085891 | | 3/2004 |
| JP | 2005-116343 | A | 4/2005 |
| JP | 2005-322429 | A | 11/2005 |
| JP | 2005-347150 | A | 12/2005 |
| JP | 3882678 | | 2/2007 |
| JP | 2007-317344 | | 12/2007 |
| WO | PCT WO 2007/105700 | | 9/2007 |

* cited by examiner

MASS SPECTROMETER

TECHNICAL FIELD

The present invention relates to a multi-turn time-of-flight mass spectrometer in which ions to be analyzed are controlled to fly along a substantially identical orbit.

BACKGROUND ART

The multi-turn time-of-flight mass spectrometer is a conventional type of mass spectrometer aimed at enhancing the mass resolution by providing a long flight distance within a limited space (for example, refer to Patent Documents 1 and 2 or other documents). In a typical multi-turn time-of-flight mass spectrometer, a plurality of sector-shaped electric fields are used to form a loop orbit having a substantially circular shape, substantially elliptical shape, "figure-8" shape or any other shape. Ions, which are generated from a sample molecule outside (or inside) this loop orbit, are introduced into the loop orbit and made to fly multiple times along the orbit, after which the ions are diverted from the loop orbit, to be introduced to and detected by an ion detector.

In this type of mass spectrometer, increasing the number of turns of ions along the loop orbit increases their flight distance and thereby enlarges the flight-time difference between two ions whose masses (or mass-to-charge ratios, m/z, to be exact) are approximate to each other, making it easier to separate these ions. That is to say, increasing the flight distance enhances the mass resolution.

As described in Patent Documents 1 and 2, this type of mass spectrometer uses a deflector electrode (or "gate electrode") for introducing ions into the loop orbit, or for diverting the ions flying along the loop orbit from the orbit and directing them toward the ion detector. For example, at an exit gate electrode, which is provided for diverting ions from the loop orbit, the ions can pass through the electrode and continue their flight along the loop orbit when no voltage is applied to the electrode. When a voltage is applied, a deflecting electric field created by the voltage affects the ions, causing them to divert from the original flight path and eventually exit from the loop orbit toward the ion detector. Alternatively, this configuration may be reversed, in which case the voltage applied to the exit gate electrode makes the ions continue their flight along the loop orbit; when the voltage application is discontinued, the ions are allowed to follow the straight path toward the ion detector.

In any case, the traveling direction of the ions is altered by changing the voltage (usually, by turning the voltage on and off) applied to the exit gate electrode. However, this method has the following problem: In the case, for example, the deflecting electric field is set to change the flight direction of the ions and make them fly toward the ion detector, the deflecting electric field cannot exert an adequate force on an ion that is just passing through the exit gate electrode at the timing of application of the voltage to the electrode. This ion deviates from the loop orbit but fails to reach the ion detector. This means that that some ions having specific masses cannot be detected irrespective of the design to obtain a mass spectrum over a broad mass range. Thus, in the previously described conventional mass spectrometers, the mass information relating to ions originating from a sample of interest may possibly be missed due to the presence of the undetectable range relating to the mass.

Patent Document 1: Japanese Unexamined Patent Application Publication No. 2005-116343

Patent Document 2: Japanese Unexamined Patent Application Publication No. 2005-322429

DISCLOSURE OF THE INVENTION

Problem to be Solved by the Invention

The present invention has been developed to solve the aforementioned problem, and its objective is to provide a multi-turn time-of-flight mass spectrometer capable of assuredly obtaining mass information of an objective ion that an analysis operator wants or needs to observe.

Means for Solving the Problems

The present invention aimed at solving the aforementioned problem is a multi-turn time-of-flight mass spectrometer in which an ion originating from a sample is made to fly one or more times along a loop orbit formed by an electric field or magnetic field and then a voltage applied to an exit gate electrode provided in the loop orbit is changed so that the flying ion is diverted from the loop orbit and introduced to a detector, which is characterized by including:

a) a specific ion designation means for designating one or more ions each having a specific mass or being included within a specific mass range; and b) a timing determining means for determining the timing to change a voltage applied to the exit gate electrode, the timing being determined so that none of the aforementioned one or more ions designated by the specific ion designation means is passing through the exit gate electrode at the determined timing.

In the mass spectrometer according to the present invention, the aforementioned one or more specific ions can be designated by various methods. In one possible mode of the present invention, the specific ion designation means includes an analysis control means for obtaining a mass spectrum under the condition that the ion or ions are prevented from traveling through the loop orbit multiple times, and an extraction means for extracting the aforementioned one or more specific ions based on one or more peaks appearing on the mass spectrum.

Preventing the ions from traveling through the loop orbit multiple times can be achieved by maintaining, from the beginning, the voltage applied to the exit gate electrode so that any ion flying along the loop orbit will be diverted from the loop orbit at the exit gate electrode. This setting averts the aforementioned problem of the undetectable range relating to the mass, and the mass spectrum obtained includes a complete set of mass values. This mass spectrum has a rather low mass resolution and rough profile as compared to the mass spectrum obtained by the multi-turn operation, yet usable to extract the specific ions.

Mass spectrums have spectrum peaks corresponding to various kinds of ions originating from the sample. Therefore, it is possible to appropriately extract one or more specific ions based on the intensity or mass position of each peak. For example, the extraction means may extract the aforementioned one or more specific ions based on the peak intensity of one or more peaks appearing on the mass spectrum. For a more specific example, it may extract a peak whose intensity is above a certain level or within a predetermined range. The number of specific ions to be extracted may be previously limited. It is also possible to extract any ion that satisfies a predetermined condition (e.g. one that falls within the aforementioned predetermined range).

As another mode of the present invention, the specific ion designation means may include a mass specification means for allowing a user to select a specific mass or mass range, and an extraction means for extracting, as the aforementioned specific ion, an ion corresponding to the mass or included in the mass range selected through the mass specification means. That is to say, obtaining the aforementioned rough mass spectrum is not mandatory for the designation of the specific ions. The technique according to the present mode is particularly useful in the case where the mass of the ion to be analyzed is previously known, or in the case where the mass is not exactly known but should be definitely within a certain mass range.

The loop orbit can be formed by using either electric field or magnetic field. As one typical mode of the present invention, the loop orbit may be formed by using a plurality of sector-shaped electric fields.

EFFECT OF THE INVENTION

In the mass spectrometer according to the present invention, while one or more objective ions that an analysis operator wants to observe or that are likely to be of interest for the analysis operator are flying along the loop orbit, the voltage applied to the exit gate electrode is switched from the state where the ions continue their flight along the loop orbit to the state where the ions are diverted from the loop orbit at a timing when none of the objective ions are flying through the exit gate electrode. Therefore, after objective ions have turned the loop orbit one or more times, their flight path can be appropriately changed by the exit gate electrode so that they will be assuredly directed toward the ion detector. As a result, all the objective ions arrive at the ion detector without being dissipated in the course of their flight, so that the mass information of the objective ions can be assuredly obtained.

If there are many kinds of specific ions, it may be impossible to satisfy the condition that none of the specific ions be passing through the exit gate electrode. This situation can be dealt with by reducing the number of kinds of the specific ions, or by dividing the specific ions into groups and performing the mass analysis multiple times, each time including one group of the specific ions.

EXPLANATION OF NUMERALS

1 . . . Ion Source
2 . . . Main Flight Space
3 . . . Loop Orbit
4 . . . Electrode Pair
5 . . . Entrance Gate Electrode
6 . . . Exit Gate Electrode
7 . . . Ion Detector
10 . . . Controller
11 . . . Orbit Voltage Generator
12 . . . Injection/Ejection Voltage Generator
13 . . . Data Processor
14 . . . Input Unit

BEST MODE FOR CARRYING OUT THE INVENTION

Figure 1:
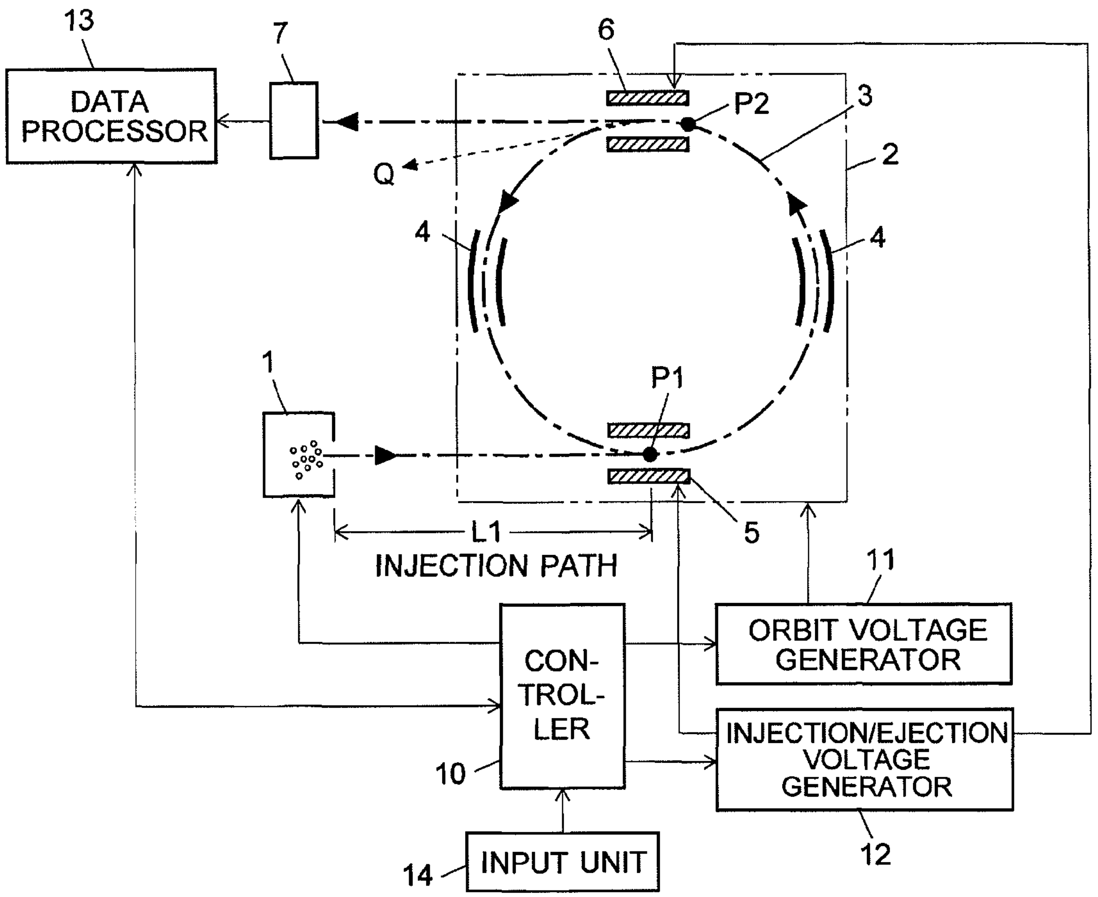
FIG. 1 is a schematic configuration diagram of a multi-turn time-of-flight mass spectrometer according to one embodiment of the present invention.

One embodiment of the multi-turn time-of-flight mass spectrometer according to the present invention is hereinafter described with reference to the drawings. FIG. 1 is a schematic configuration diagram of the multi-turn time-of-flight mass spectrometer according to the present embodiment.

An ion source 1 ionizes sample molecules into various kinds of ions and supplies these ions with a predetermined amount of energy to make them begin to fly. Alternatively, the ion source 1 may be designed similar to a three-dimensional quadrupole ion trap or other devices that temporarily hold a group of externally generated ions and simultaneously supply these ions with a predetermined amount of energy to make them begin to fly.

After beginning their flight from the start point, i.e. the ion source 1, the ions are introduced through an entrance gate electrode 5 into a main flight space 2, in which they are guided into a loop orbit 3. The loop orbit 3 is formed by the effect of a plurality of sector-shaped electric fields each generated by a pair of sector-shaped electrodes 4, although only some of the sector-shaped electrode pairs 4 are shown. The loop orbit 3 in the figure has a circular shape, which is a mere example and the loop orbit 3 can have various kinds of shapes, such as a substantially elliptical shape or "figure-8" shape.

After turning along the loop orbit 3 one or more times, when passing through the exit gate electrode 6, the ions are diverted from the loop orbit 3. The diverted ions exit the main flight space 3 and continues to fly until they arrive at, and are detected by, an ion detector 7 outside the main flight space 2. The detection signals of the ion detector 7 are sent to a data processor 13, which performs the necessary data processing, such as converting the time of flight of each ion to mass, creating mass spectrums, and performing qualitative and quantitative analyses.

An orbit voltage generator 11 applies a predetermined DC voltage to each of the sector-shaped electrode pairs 4 to create a sector-shaped electric field within the space sandwiched between each pair of sector-shaped electrodes 4. An injection/ejection voltage generator 12 applies a deflecting voltage for injecting ions into the loop orbit 3 and a deflecting voltage for ejecting ions from the loop orbit 3 to the entrance gate electrode 5 or the exit gate electrode 3, respectively, at predetermined timings. A controller 10 controls these voltage generators 11 and 12, ion source 1, data processor 13 and other components to perform a mass analysis operation, which will de described later. The input unit 14 is used to manually enter various parameters necessary for the analysis.

In this configuration, increasing the number of turns of the ions along the loop orbit 3 increases their flight distance and accordingly improves the mass resolution. The flight distance between the ion source 1 and the entrance gate electrode 5 is short and the ions are nearly simultaneously released from the ion source 1. Therefore, when the ions enter the loop orbit 3, they have only a negligible flight-time difference even though they have different masses. Therefore, all the ions can be collectively injected into the loop orbit 3 by applying a predetermined deflecting voltage to the entrance gate electrode 5 at a specific timing. During their flight along the loop orbit 3, the ions having smaller masses fly faster, leaving behind the ions having larger masses. As a result, at a certain point in time, each ion having a different mass will be located at a different point on the loop orbit 3.

Increasing the number of turns of the ions may possibly cause a faster ion to catch up with and pass by a slower ion. This lapping of the ions will result in two or more ions having discrete mass values located at the same point on the loop orbit 3 at a certain point in time.

With reference to FIG. 1, the following parameters are hereinafter used:

L1: the distance from the ion source 1 to the introduction point P1 of the loop orbit 3 at the entrance gate electrode 5.

C1: the distance, measured along the loop orbit 3, from the introduction point P1 within the entrance gate electrode 5 to the entry point P2 of the exit gate electrode 3.

Ct: the circumferential length of the loop orbit 3.

Lg2: the ion-path length inside the exit gate electrode 6.

tg: the length of time from the point in time when the acceleration of ions within the ion source 1 is initiated to the point in time when the application of an ejection-side deflecting voltage to the exit gate electrode is initiated.

The ion path length inside the entrance gate electrode 5 is not essential in the present case and hence assumed to be zero for ease of explanation.

Given that an ion begins to be accelerated within the ion source 1 at time t=0, the distance U that the ion travels until t=tg is given by $$U = v \cdot tg,$$

where v is the speed of the ion. The condition for the ion to be found within the exit gate electrode 6 (i.e. for the ion to be passing through the exit gate electrode 6) can be expressed by the following equation (1):

$$C1 < \mathrm{Mod}(v \cdot tg - L1, Ct) < C1 + Lg2 \quad (1),$$

where Mod(a, b) is the remainder of a divided by b.

The deflecting electric field that is formed when the deflecting voltage is applied to the exit gate electrode 6 does not sufficiently act on an ion that satisfies the condition expressed by equation (1). Such an ion will be certainly diverted from the loop orbit 3 but then follow an irregular path, e.g. as shown by numeral Q in FIG. 1, to be eventually dissipated without arriving at the ion detector 7. Therefore, this ion cannot be detected by the ion detector 7 and will be an "undetectable ion."

Figure 3:
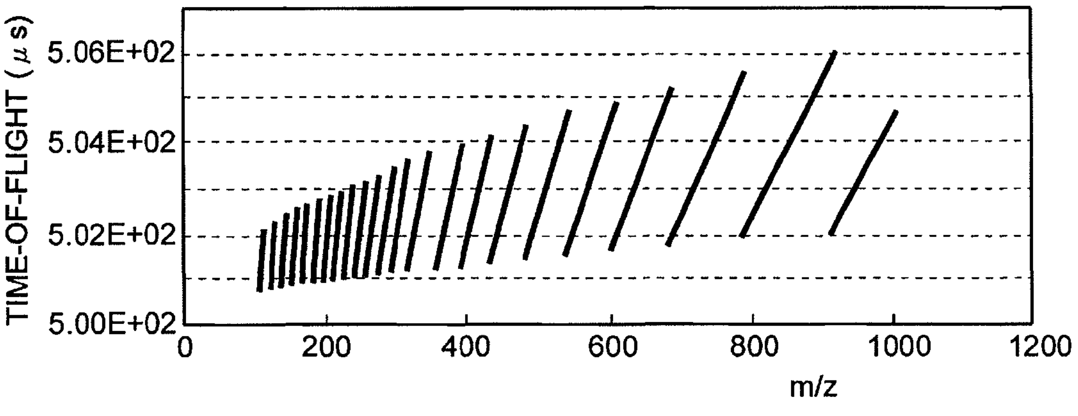
FIG. 3 is a graph showing a simulation result of the relationship between the mass-to-charge ratio and the time of flight.
Figure 4:
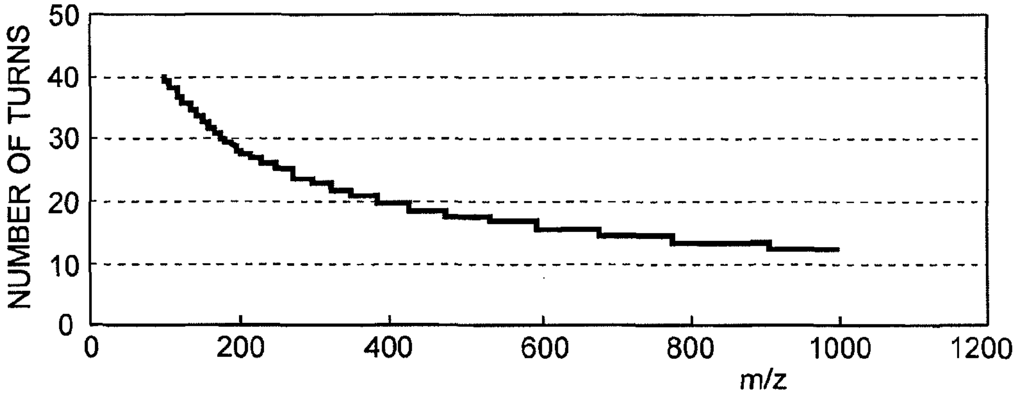
FIG. 4 is a graph showing an example of the simulation result of the relationship between the mass-to-charge ratio and the number of turns for the same value of tg.
Figure 5:
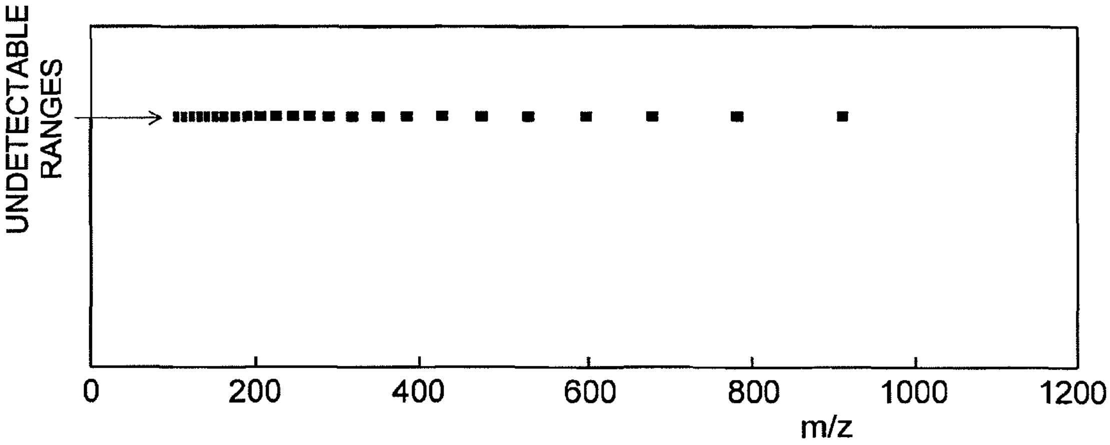
FIG. 5 is a chart showing an example of the simulation result of an undetectable range.

FIGS. 3 to 5 show a simulation result obtained under the conditions that the aforementioned parameters were tg=500 μs, L1=565 mm, Ct=973 mm and C1=390 m, the m/z range was from 100 to 1000, and the acceleration voltage was 7 kV. FIG. 3 shows the relationship between the mass-to-charge-ratio and the flight time, FIG. 4 shows the relationship between the mass-to-charge-ratio and the number of turns for the same value of tg, and FIG. 5 shows the mass-to-charge ratios of undetectable ions (i.e. undetectable ranges relating to the mass). These results demonstrate that the aforementioned conditions cause the discrete occurrence of undetectable ranges relating to the mass, as shown in FIG. 5.

An ion which the user wants to observe or which is likely to be of interest for the user must not be within any of those undetectable ranges. If L1, C1 and Ct were changed from the aforementioned values, the undetectable ranges would move along the mass axis. However, these values are practically invariable since they depend on the configuration of the ion optical system. Accordingly, in the mass spectrometer according to the present embodiment, the time tg is appropriately specified so that the mass or mass range of the ion which the user wants to observe or which is likely to be of interest for the user will not overlap any of the undetectable ranges.

Figure 2:
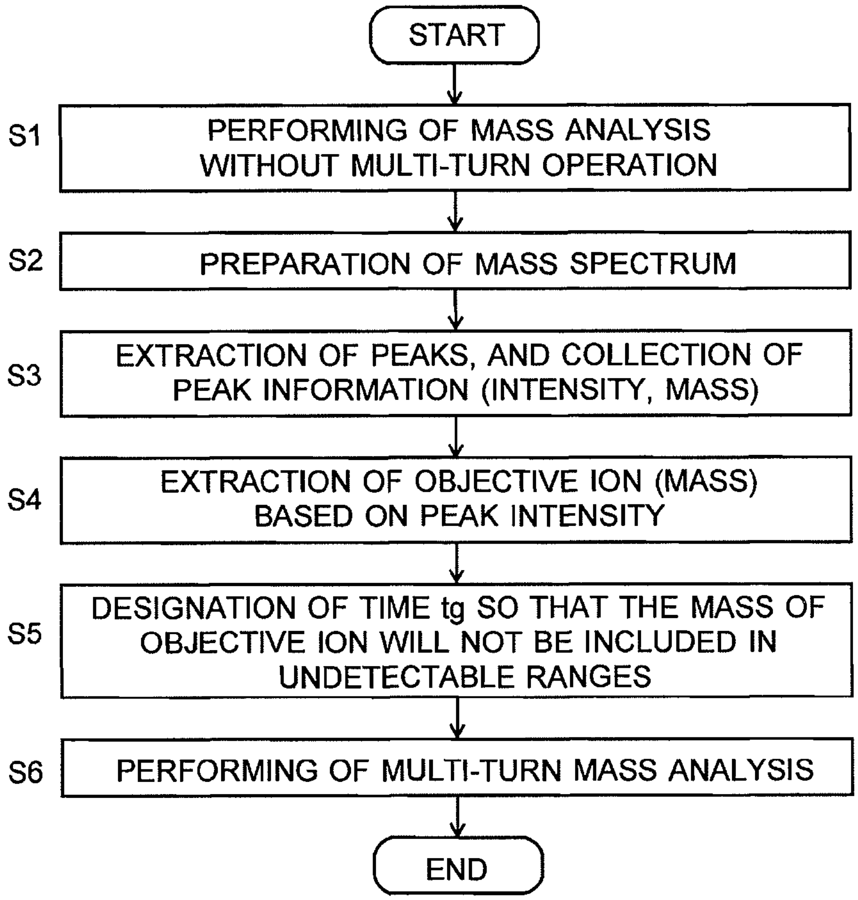
FIG. 2 is a control flowchart showing the analysis steps in the multi-turn time-of-flight mass spectrometer according to the present embodiment.

For this purpose, the analysis is performed in a specific manner, which will be hereinafter described with reference to the flowchart of FIG. 2.

In the first stage of the analysis relating to a sample to be analyzed, a mass analysis without a multi-turn operation is performed and a mass spectrum is created (Steps S1 and S2). More specifically, the deflecting voltage applied to the entrance gate electrode 5 is set so that the ions coming from the ion source 1 will be injected into the loop orbit 3, while the deflecting voltage applied to the exit gate electrode 6 is set so that the ions flying along the loop orbit 3 will be diverted toward the ion detector 7. Additionally, a voltage for forming a sector-shaped electric field is applied to the sector-shaped electrode pair 4 forming one half of the loop orbit 3 from the entrance gate electrode 5 to the exit gate electrode 6. In this voltage setting, a variety of ions released from the ion source 1 are injected via the entrance gate electrode 5 into the loop orbit 3. Then, after flying through approximately one half of the loop orbit 3, those ions are diverted from the loop orbit 3 at the exit gate electrode 6 and directed toward the ion detector 7, to be detected by the ion detector 7. The flight distance in the present case is naturally shorter than in the case of the multi-turn operation, and the mass resolution is accordingly low. However, the resultant mass spectrum is good enough to grasp the outline.

Next, the data processor 13 searches the resultant mass spectrum for the peaks and collects information of each peak spectrum, i.e. the peak intensity and the mass of the peak top (Step S3). In the present example, on the assumption that the peaks having high intensities are the ions that the user wants to observe, any peak having a peak intensity higher than a predetermined level is selected, and the ion corresponding to the selected peak is designated as an objective ion (Step S4). If two or more objective ions have been selected, priorities are assigned in the decreasing order of peak intensity.

Subsequently, a value of time tg at which the undetectable ranges do not include the mass of any objective ion is determined as follows (Step S5): In order of priority, a range of time tg at which the undetectable ranges do not include the mass of any objective ion is set. More specifically, a range TG of time tg at which the undetectable ranges do not include the mass of the objective ion having the first priority is initially set. Next, the range of time tg corresponding to the undetectable range of the mass of the objective ion having the second priority is excluded from the aforementioned time range TG to obtain a new time range TG'. Specifying the time tg within this time range TG' guarantees that at least the ions having the first and second priorities are detectable. The time range can be further narrowed by performing the same process for the other peaks having the third and subsequent priorities. After the process has been performed for all the objective ions, an appropriate time tg is specified within the eventually obtained time range.

After the time tg has been specified, the controller 10 performs a mass analysis including a multi-turn operation along the loop orbit 3, controlling the injection/ejection voltage generator 12 so that the voltage applied to the exit gate electrode 6 is changed to the deflecting voltage at the specified time tg.

If there are many objective ions, or if an objective ion has a specific mass, it may be impossible to find, in Step S5, an appropriate time tg at which the undetectable ranges do not include the mass of any of the objective ions. In such a case, the previously described process may be discontinued halfway to specify a time tg for high-priority objective ions only. Alternatively, if the multi-turn mass analysis in Step S6 may be performed multiple times, it is possible to divide the objective ions into groups and repeatedly perform the mass analysis while specifying an appropriate time tg for each group.

The selection of objective ions from the mass spectrum obtained without performing a multi-turn operation may be made according to a different criterion other than the decreasing order of peak intensity. For example, the selection may be made in increasing or decreasing order of mass within a predetermined mass range. It is also possible to allow the user to manually specify a desired mass range through the input unit 14 so that the peaks included in the specified mass range will be exclusively extracted.

It is also possible to omit the mass analysis without a multi-turn operation and determine the time tg so that the mass value or mass range specified by the user through the input unit 14 can be observed. In this case, the user may possibly specify too broad a mass range for which the time tg cannot be appropriately determined. To deal with this situation, it is preferable to provide a function for informing the user of the situation and requesting the user to once more specify the mass range. Alternatively, it is possible to present undetectable ranges to the user beforehand and perform the multi-turn mass analysis with the user's consent.

It should be noted that the embodiment described to this point is a mere example of the present invention, and any change, modification or addition that is appropriately made within the spirit of the present invention will be evidently included within the scope of claims of the present patent application.

The invention claimed is:

1. A multi-turn time-of-flight mass spectrometer in which an ion originating from a sample is made to fly one or more times along a loop orbit formed by an electric field or magnetic field and then a voltage applied to an exit gate electrode provided in the loop orbit is changed so that the flying ion is diverted from the loop orbit and introduced to a detector, which is characterized by comprising:

a) a specific ion designator for designating one or more ions each having a specific mass or being included within a specific mass range; and b) a timing determiner for determining a timing at which none of the aforementioned one or more ions designated by the specific ion designator is passing through the exit gate electrode; and c) a voltage generator for changing a voltage applied to the exit gate electrode at the determined timing.

2. The mass spectrometer according to claim 1, which is characterized in that the specific ion designator includes:

an analysis controller for obtaining a mass spectrum under a condition that the ion or ions are prevented from traveling through the loop orbit multiple times; and an extractor for extracting the aforementioned one or more specific ions based on one or more peaks appearing on the mass spectrum.

3. The mass spectrometer according to claim 2, which is characterized in that the loop orbit is formed by using a plurality of sector-shaped electric fields.

4. The mass spectrometer according to claim 1, which is characterized in that the specific ion designator includes:

an analysis controller for obtaining a mass spectrum under a condition that the ion or ions are prevented from traveling through the loop orbit multiple times; and an extractor for extracting the aforementioned one or more specific ions based on a peak intensity of one or more peaks appearing on the mass spectrum.

5. The mass spectrometer according to claim 4, which is characterized in that the loop orbit is formed by using a plurality of sector-shaped electric fields.

6. The mass spectrometer according to claim 1, which is characterized in that the specific ion designator includes:

a mass specifier for allowing a user to select a specific mass or mass range; and an extractor for extracting, as the aforementioned specific ion, an ion corresponding to the mass or included in the mass range selected through the mass specifier.

7. The mass spectrometer according to claim 6, which is characterized in that the loop orbit is formed by using a plurality of sector-shaped electric fields.

8. The mass spectrometer according to claim 1, which is characterized in that the loop orbit is formed by using a plurality of sector-shaped electric fields.

9. A method for operating a multi-turn time-of-flight mass spectrometer in which an ion originating from a sample is made to fly one or more times along a loop orbit formed by an electric field or magnetic field and then a voltage applied to an exit gate electrode provided in the loop orbit is changed so that the flying ion is diverted from the loop orbit and introduced to a detector, comprising:

a) designating one or more ions each having a specific mass or being included within a specific mass range;

b) determining a timing at which none of the aforementioned one or more ions designated in the step of designating one or more ions is passing through the exit gate electrode; and c) changing the voltage applied to the exit gate electrode at the determined timing.

10. The method for operating a mass spectrometer according to claim 9, which is characterized in that the step of designating one or more ions includes:

obtaining a mass spectrum under a condition that the ion or ions are prevented from traveling through the loop orbit multiple times; and extracting the aforementioned one or more specific ions based on one or more peaks appearing on the mass spectrum.

11. The method for operating a mass spectrometer according to claim 9, which is characterized in that the step of designating one or more ions includes:

obtaining a mass spectrum under a condition that the ion or ions are prevented from traveling through the loop orbit multiple times; and extracting the aforementioned one or more specific ions based on a peak intensity of one or more peaks appearing on the mass spectrum.

12. The method for operating a mass spectrometer according to claim 9, which is characterized in that the step of designating one or more ions includes:

selecting by a user a specific mass or mass range; and extracting, as the aforementioned specific ion, an ion corresponding to the mass or included in the mass range selected in the step of selecting the specific mass or mass range.

* * * * *